US008720423B2

(12) United States Patent
Perr et al.

(10) Patent No.: US 8,720,423 B2
(45) Date of Patent: May 13, 2014

(54) MULTI-ROTOR FLOW CONTROL VALVE

(75) Inventors: J. Victor Perr, Greenwood, IN (US);
Atul Shinde, Pune (IN); Parashuram Kapase, Pune (IN); Onkarappa Bolanahalli, Hadapspar (IN); Ambarish Bv, Pune (IN)

(73) Assignee: Cummins Inc., Columbus, IN (US)

( * ) Notice: Subject to any disclaimer, the term of this patent is extended or adjusted under 35 U.S.C. 154(b) by 858 days.

(21) Appl. No.: 12/764,478

(22) Filed: Apr. 21, 2010

(65) Prior Publication Data
US 2011/0260087 A1 Oct. 27, 2011

(51) Int. Cl.
*F02M 25/07* (2006.01)
*F16K 5/00* (2006.01)
*B21D 51/16* (2006.01)

(52) U.S. Cl.
USPC .................................. 123/568.23; 123/190.1

(58) Field of Classification Search
USPC ........... 29/890.12, 890.132; 137/625.42, 246, 137/315.25, 552.5; 251/207, 209, 336, 309; 4/287; 123/568.12, 568.24, 190.1
See application file for complete search history.

(56) References Cited

U.S. PATENT DOCUMENTS

| | | | | |
|---|---|---|---|---|
| 1,054,020 A | * | 2/1913 | Mougette | 137/552.5 |
| 1,247,682 A | * | 11/1917 | Howell | 396/298 |
| 1,964,663 A | * | 6/1934 | Gossler | 251/250 |
| 1,969,375 A | * | 8/1934 | Laurent | 251/192 |
| 1,986,252 A | * | 1/1935 | Conran | 137/383 |
| 3,063,468 A | * | 11/1962 | Dufour | 137/552.5 |
| 3,396,904 A | * | 8/1968 | Janette | 251/78 |
| 3,781,580 A | | 12/1973 | Williams et al. | |
| 4,092,963 A | | 6/1978 | Vrooman | |
| 4,134,377 A | | 1/1979 | Bamsey et al. | |
| 4,258,687 A | | 3/1981 | Mauch et al. | |
| 4,453,527 A | * | 6/1984 | Wade | 123/669 |
| 4,532,961 A | * | 8/1985 | Walton et al. | 137/625.31 |
| 4,554,943 A | | 11/1985 | Claney et al. | |
| 5,067,319 A | | 11/1991 | Moser | |

(Continued)

FOREIGN PATENT DOCUMENTS

| | | |
|---|---|---|
| EP | 1426603 | 6/2004 |
| GB | 573715 | 12/1945 |
| GB | 700789 | 12/1953 |

OTHER PUBLICATIONS

International Search Report and Written Opinion, PCT/US2011/033222, Cummins, Inc., Jun. 30, 2011.

*Primary Examiner* — Stephen K Cronin
*Assistant Examiner* — Arnold Castro
(74) *Attorney, Agent, or Firm* — Krieg DeVault LLP

(57) ABSTRACT

An article of manufacture includes a first rotor having a first flow-through area that is more than 50% of a total first rotor flow area and a first ridged arc member, and a second rotor having a second flow-through area that is more than 50% of a total second rotor flow area and a second ridged arc member. The article further includes an upstream stator and a downstream stator, each stator having a co-extensive stator flow-through area and a co-extensive structural area. The article includes an actuator having an engagement gear between the ridged arc members, where a turn of the engagement gear moves the ridged arc members in opposing directions. The first rotor and second rotor are phased to be at a maximum closed at a first position of the engagement gear and a maximum open at a second position of the engagement gear.

20 Claims, 5 Drawing Sheets

(56) References Cited

U.S. PATENT DOCUMENTS

| | | | |
|---|---|---|---|
| 5,322,043 A * | 6/1994 | Shriner et al. | 123/295 |
| 5,417,083 A * | 5/1995 | Eber | 62/528 |
| 6,192,922 B1 * | 2/2001 | MacGibbon et al. | 137/486 |
| 6,647,971 B2 | 11/2003 | Vaughan et al. | |
| 6,726,174 B2 | 4/2004 | Bareis et al. | |
| 6,736,160 B2 | 5/2004 | Nagai et al. | |
| 6,910,850 B2 | 6/2005 | Nonaka et al. | |
| 7,363,919 B1 | 4/2008 | Styles | |
| 7,533,659 B2 | 5/2009 | Klipfel et al. | |
| 7,607,302 B2 | 10/2009 | Fry et al. | |
| 8,210,205 B2 * | 7/2012 | Michaels | 137/625.46 |
| 2007/0125081 A1 | 6/2007 | Czarnowski et al. | |
| 2007/0144170 A1 | 6/2007 | Griffith | |

\* cited by examiner

US 8,720,423 B2

MULTI-ROTOR FLOW CONTROL VALVE

BACKGROUND

The technical field generally relates to flow control valves in engine related gaseous streams. Presently available flow control valves suffer from highly constrained trade-offs between flow capacity and controllability. Butter fly and poppet valves have very good flow capacity but they have a highly non-linear flow response making controllability difficult. Butter fly and poppet valves also require relatively large actuator torque to control the valve. Rotary valves have improved controllability with a more linear flow response, but also have drawbacks. Rotary valves have limited available flow area and therefore a reduced flow capacity, and further many commercially available rotary valves include a 90° turn within the valve or on exit of the valve, thereby increasing pressure drop and further reducing flow capacity. Therefore, further technological developments are desirable in this area.

SUMMARY

One embodiment is a unique article of manufacture including a high capacity, highly responsive rotary valve. Further embodiments, forms, objects, features, advantages, aspects, and benefits shall become apparent from the following description and drawings.

DESCRIPTION OF THE ILLUSTRATIVE EMBODIMENTS

Figure 1:
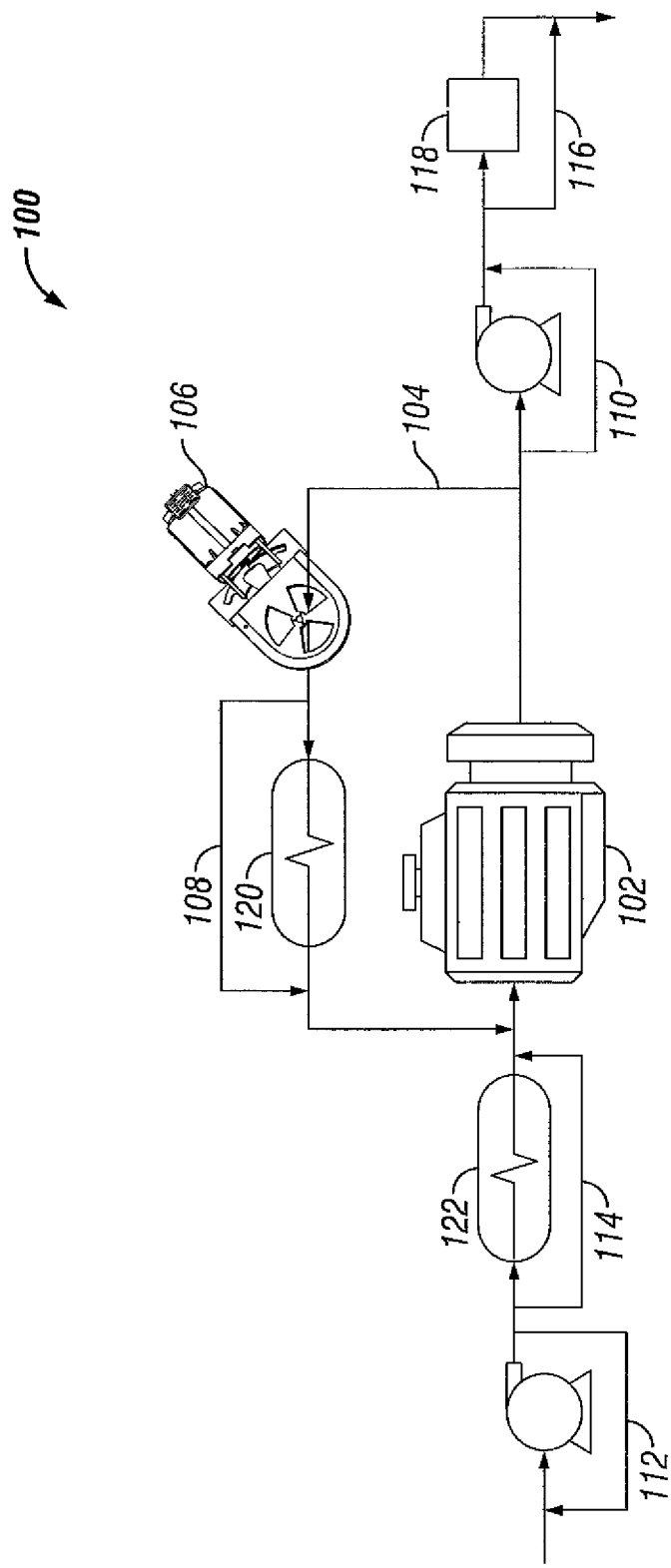
FIG. 1 is a schematic diagram of a system including a high capacity rotary valve.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 including a high capacity rotary valve 106. The system 100 includes an internal combustion engine 102 having a gaseous flow stream 104 and the rotary valve 106 disposed in the gaseous flow stream 104. The system 100 may further include an intercooler 122, an EGR cooler 120, and/or an aftertreatment component 118. The exemplary system 100 further includes a compressor 124 and a turbine 126. The compressor 124 and turbine 126 are shown separately in FIG. 1 to more clearly show the operational connections of various streams, but the compressor 124 and turbine 126 are typically positioned together in a turbocharger device connected by a shaft. The gaseous flow stream 104 may be an exhaust gas recirculation (EGR) 104 as shown, but the gaseous flow stream 104 may be any engine-related stream known in the art. Non-limiting exemplary gaseous flow streams include an EGR cooler bypass 108, a turbine bypass 110, a compressor bypass 112, an intercooler bypass 114, and/or an aftertreatment component bypass 116. The routes and connections of the various bypass streams are exemplary and non-limiting. The system 100 may include multiple rotary valves 106 although only one is shown for clarity.

Figure 2A:
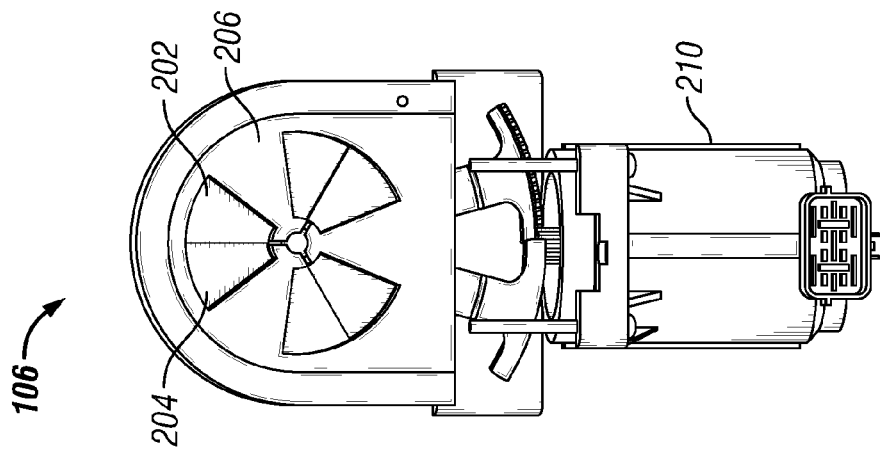
FIG. 2a is a schematic diagram of a high capacity rotary valve at first open position.

FIG. 2a is a schematic diagram of a high capacity rotary valve 106. The rotary valve 106 includes a first rotor 204 (reference FIG. 2b) and a second rotor 202. In the illustration of FIG. 2a, the rotors 202, 204 are at a second position, or an open position, having a maximum flow-through area 208. The rotary valve 106 includes a stator 206 coupled to the rotors, the stator having a flow-through area including the maximum flow-through area 208. The maximum flow-through area 208 represents the greatest available flow-through area available from the orifices, slots, or other openings in the stator 206, as limited by structural or other considerations. For example, pins, bolts, screws, or other devices may attach to or pass through the stator 206, and a portion of the rotors 202, 204 may not rotate completely out of the path of the stator 206 openings.

Figure 2B:
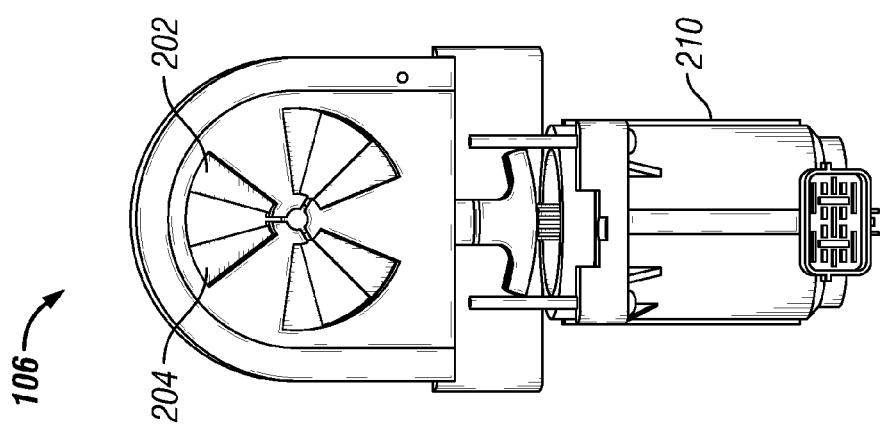
FIG. 2b is a schematic diagram of the high capacity rotary valve at an intermediate position.
Figure 2C:
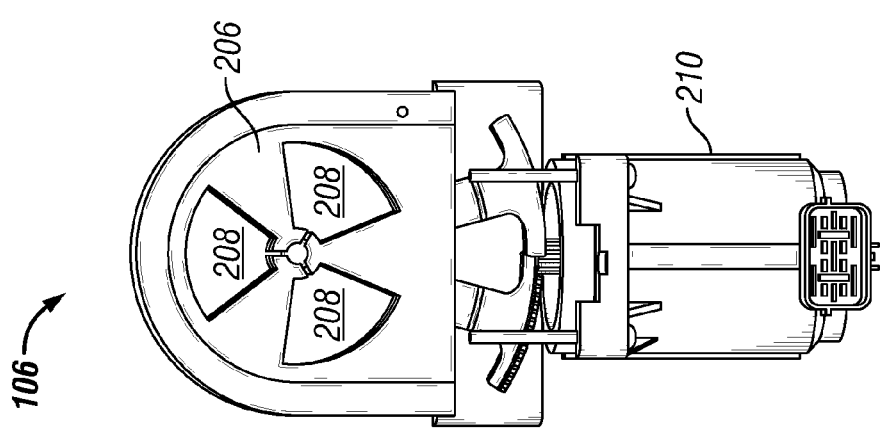
FIG. 2c is a schematic diagram of the high capacity rotary valve at a second position.

In certain embodiments, the first rotor 202 and the second rotor 204 rotate simultaneously and in opposite directions. In certain embodiments, a single actuator 210 moves both the first rotor 202 and the second rotor 204. The rotation of the rotors 202, 204 in simultaneous, opposite directions allows for rapid response of the rotary valve 206 to a position command, and further enables ease of actuating both rotors 202, 204 from a single actuator. In alternate embodiments, the rotors 202, 204 may move in the same direction, serially, be independently operable, or actuated in any manner known in the art. FIG. 2c illustrates the rotors 202, 204 in a first position that closes the gaseous flow stream. The rotors 202, 204 in FIG. 2c co-ordinate to cover the maximum flow-through area 208 of the stator 206. The illustration of FIG. 2b shows the rotors 202, 204 rotated to an intermediate position.

Figure 5C:
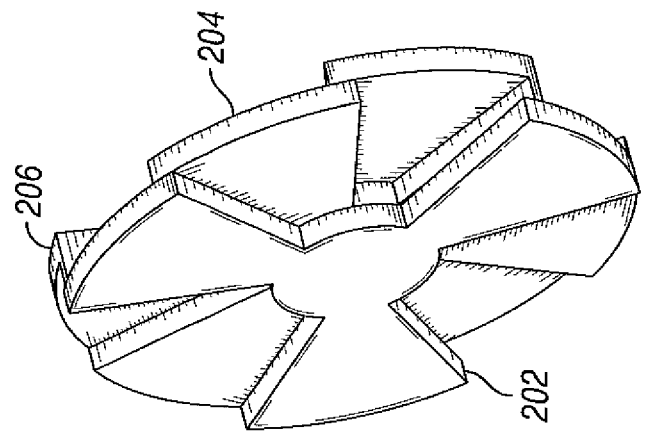
FIG. 5c is a schematic diagram of an isometric view of the first rotor and the second rotor in the second position.
Figure 5B:
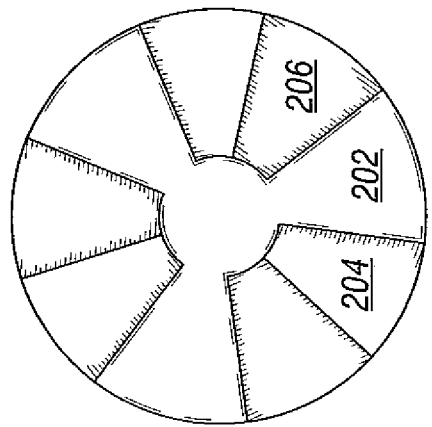
FIG. 5b is a schematic diagram of the first rotor and the second rotor in a second position.
Figure 5A:
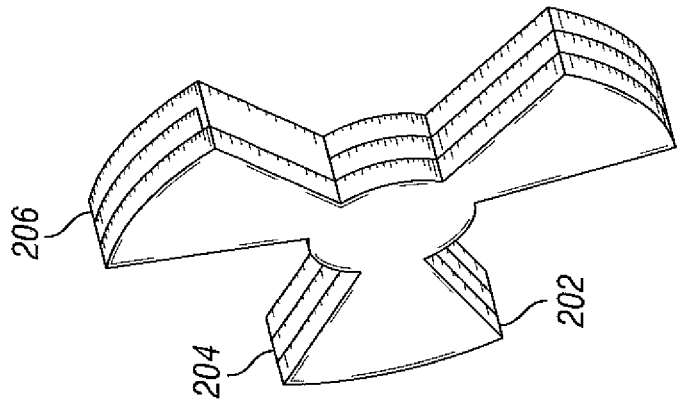
FIG. 5a is a schematic diagram of a first rotor and a second rotor in a first position.

In certain embodiments, the maximum flow-through area 208 includes more than 50% of a total flow area of the gaseous flow stream. In certain further embodiments, the maximum flow-through area comprises more than 66% of a total flow area of the gaseous flow stream. Referencing FIG. 5, rotors 202, 204 and a stator 206 from a rotary valve are illustrated, where the stator 206 includes a maximum flow-through area of around ⅔ of a total flow area of a gaseous flow stream in which the valve is positioned. It can be seen that the use of multiple rotors allows a maximum flow area of $$\left(1 - \frac{n-1}{n}\right),$$

where n is the number of rotors utilized. In certain embodiments, the rotary valve includes n rotors, and the rotary valve includes a maximum flow-through area 208 of less than a fraction $$\left(1 - \frac{n-1}{n}\right),$$

a fraction between 0.5 and $$\left(1 - \frac{n-1}{n}\right),$$

and alternatively or additionally a fraction between $$\left(1 - \frac{n}{n+1}\right) \text{ and } \left(1 - \frac{n-1}{n}\right).$$

The number of rotors n may be any integer value, including at least a value of 2 and a value between 3 and 6, inclusive.

Figure 4:
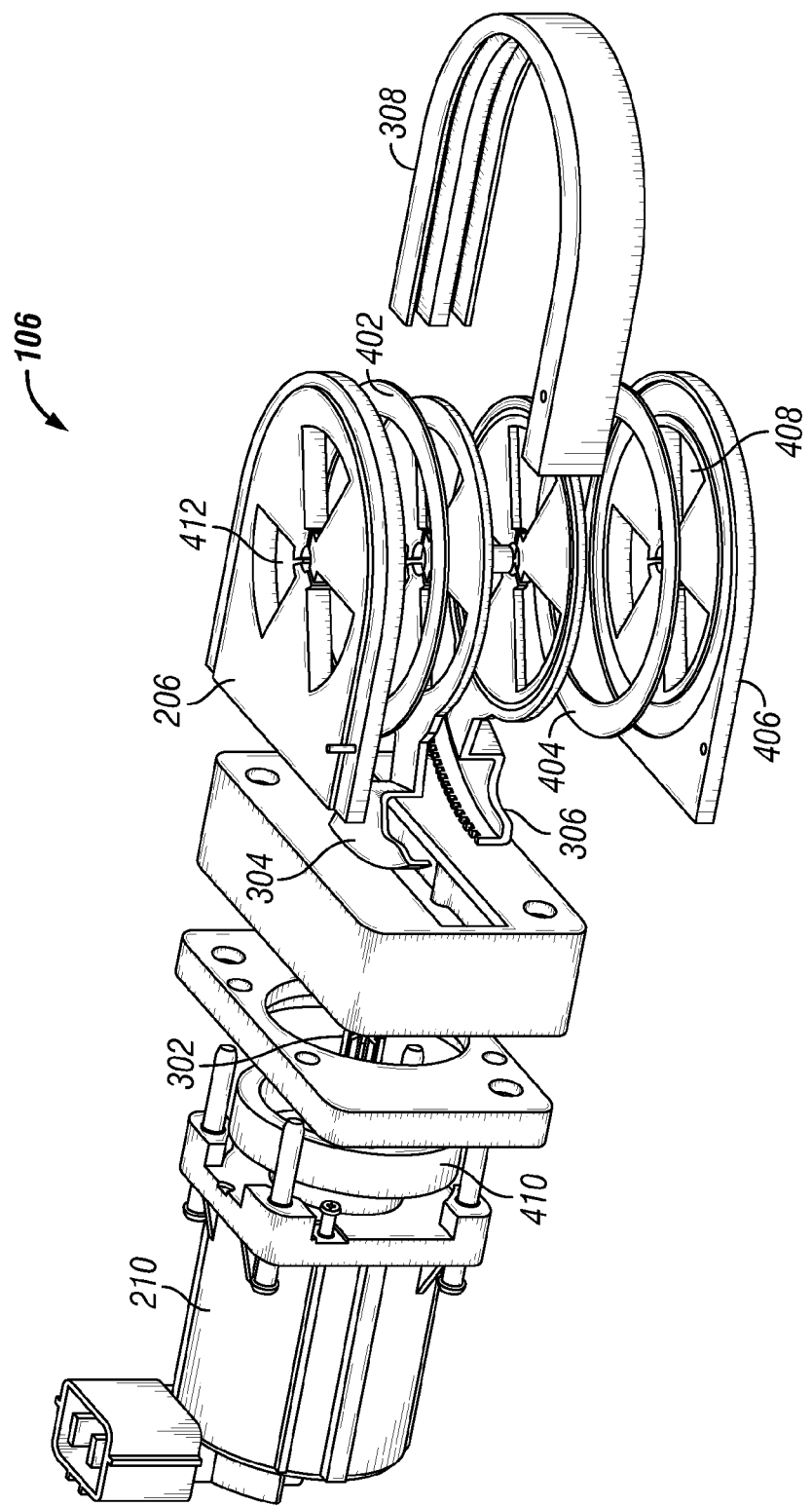
FIG. 4 is an exploded schematic illustration of a high capacity rotary valve.

Referencing FIG. 4, an exploded rotary valve 106 is shown. The rotary valve includes a second stator 406, where each of the stator 206 and the second stator 406 engage a spacer 308. The second stator 406 includes a second flow-through area 408 that includes the maximum flow-through area 208. In certain embodiments, each of a flow-through area 412 through the stator 206 and the second flow-through area 408 through the second stator 408 correspond to the maximum flow-through area 208. In certain embodiments, the flow through area 412 and the second flow-through area 408 are aligned and close in the first position of the rotors (e.g. as illustrated in FIG. 2c) and open in the second position of the rotors (e.g. as illustrated in FIG. 2a).

An exemplary system includes a total of n rotors, where the maximum flow-through area includes a fraction of a total flow area of the gaseous fluid stream, and where the fraction has a value between $$\left(1 - \frac{n}{n+1}\right) \text{ and } \left(1 - \frac{n-1}{n}\right).$$

In further embodiments, n may be a value between 3 and 6, inclusive. In certain embodiments, the system includes a total of n rotors, where the maximum flow-through area includes a fraction of a total flow area of the gaseous fluid stream, and where the fraction has a value between $$\left(1 - \frac{n}{n+1}\right)$$

and 0.5.

In certain embodiments, the gaseous flow stream may be a high temperature and/or corrosive stream. The stators 206, 406 and the spacer 308 are a material capable of withstanding the temperature and composition of the gaseous flow stream, and in certain embodiments the stators 206, 406 and the spacer 308 are stainless steel, and may specifically be steel 316. In certain embodiments, the rotors 202, 204 are a high temperature material that may include Inconel®, tungsten, titanium, or other high temperature and/or corrosion resistant material. In certain embodiments, stainless steel and/or high temperature materials may not be required for the stators 206, 406, rotors 202, 204, and spacer 308.

Figure 3:
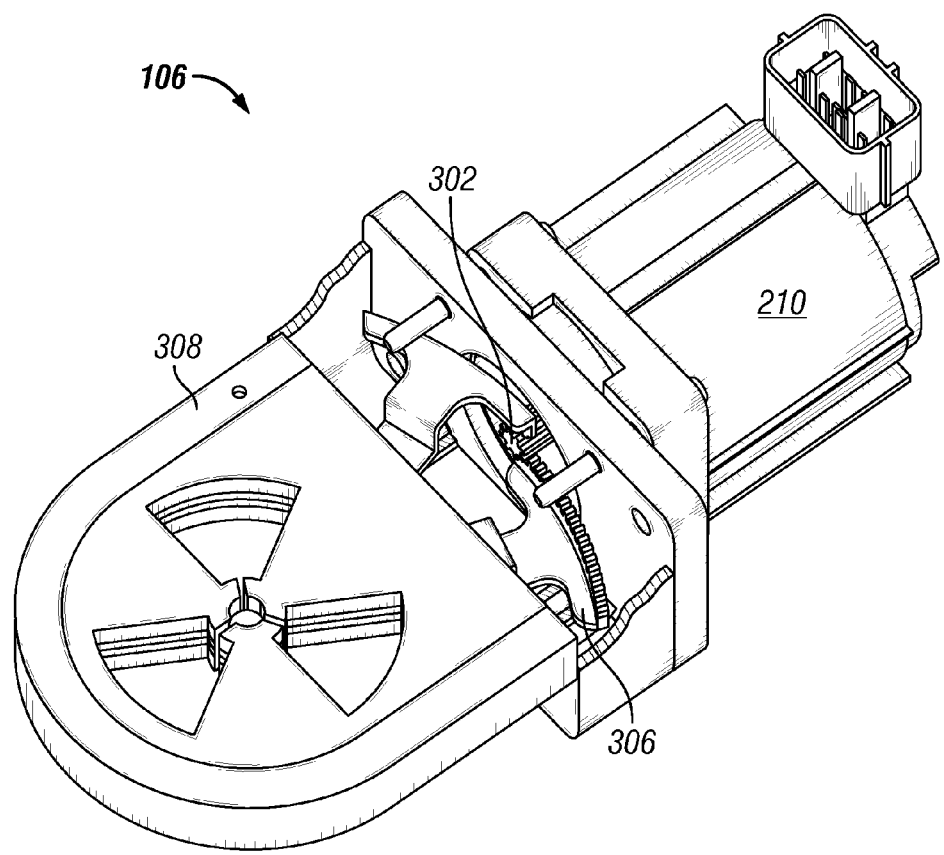
FIG. 3 is a schematic diagram of a high capacity rotary valve separated to illustrate an engagement gear and ridged arc members.

FIG. 4 is an exploded schematic illustration of a rotary valve 106. The rotary valve 106 includes the first rotor 202 having a first flow-through area that is more than 50% of a total first rotor flow area (e.g. the area of the first rotor 202 disposed in the gaseous fluid stream). The rotary valve 106 includes a second rotor 204 having a second flow-through area that is more than 50% of a total second rotor flow area. The first rotor 202 includes a first ridged arc member 304 and the second rotor 204 includes a second ridged arc member 306. The rotary valve 106 further includes an upstream stator 206 and a downstream stator 406, each stator having a co-extensive stator flow-through area 412, 408 and a co-extensive structural area (i.e. the portions of the stators 206, 406 that are not the flow-through areas 412, 408). The rotary valve 106 includes an actuator 210 having an engagement gear 302, where the engagement gear 302 is disposed between the first ridged arc member 304 and the second ridged arc member 306 (reference FIG. 3). The ridged arc members 304, 306 include ridges or teeth that engage the engagement gear 302 such that a turn of the engagement gear moves the first ridged arc member 304 and the second ridged arc member 306 in opposing directions. The first rotor 202 and the second rotor 204 are phased such that, at a first position of the engagement gear 302 (e.g. reference FIG. 2c) the first rotor and second rotor co-ordinate to cover the co-extensive stator flow-through area (i.e. the rotary valve 106 is closed or at a minimally open position), and such that at a second position of the engagement gear 302 (e.g. reference FIG. 2a) the first flow-through area and the second flow-through areas are co-extensive and include the co-extensive stator flow-through areas 408, 412.

The exemplary rotary valve 106 further includes the spacer 308 engaging the upstream stator 206 and the downstream stator 406, the spacer 308 having an axial extent encompassing the upstream stator 206 and the downstream stator 406. The rotary valve 106 further a ceramic spacer 410 disposed between the actuator 210 and the spacer 308. The ceramic spacer 410 reduces heat transfer to the actuator 210 and is capable of withstanding the temperatures experienced from heat transfer by the gaseous stream. The ceramic spacer 410 may be made of other non-ceramic materials that withstand the required temperatures and that reduce heat transfer including at least glass and rock wool. The rotary valve 106 further includes a first beveled washer 402 disposed between the upstream stator 206 and the first rotor 202, and a second beveled washer 404 disposed between the downstream stator 406 and the second rotor 204. In certain embodiments, the first flow-through area through the first rotor 202 is between 55% to 75% of the total first rotor flow area, and the second flow-through area through the second rotor 204 is between 55% to 75% of the total second rotor flow area.

As is evident from the figures and text presented above, a variety of embodiments according to the present invention are contemplated.

One exemplary embodiment is a system, including an internal combustion engine having a gaseous flow stream and a rotary valve disposed in the gaseous flow stream. The rotary valve includes a first rotor and a second rotor, where the first rotor and the second rotor rotate simultaneously and in opposite directions. The rotors in a first position close the gaseous flow stream and in a second position the rotors include a maximum flow-through area. The system further includes a stator coupled to the rotors, the stator having a flow-through area including the maximum flow-through area. In certain embodiments, the maximum flow-through area includes more than 50% of a total flow area of the gaseous flow stream. In certain further embodiments, the maximum flow-through area comprises more than 66% of a total flow area of the gaseous flow stream. The gaseous flow stream may be an exhaust gas recirculation (EGR), an EGR cooler bypass, a turbine bypass, a compressor bypass, an intercooler bypass, or an aftertreatment component bypass. In certain embodiments, a single actuator moves both the first rotor and the second rotor.

The exemplary system further includes a second stator, where each of the stator and the second stator engage a spacer, and where the second stator includes a second flow-through area also including the maximum flow-through area. In certain embodiments, each of the flow-through area and the second flow-through area correspond to the maximum flow-through area.

An exemplary system includes a total of n rotors, where the maximum flow-through area includes a fraction of a total flow area of the gaseous fluid stream, and where the fraction has a value between $$\left(1 - \frac{n}{n+1}\right) \text{ and } \left(1 - \frac{n-1}{n}\right).$$

In further embodiments, n may be a value between 3 and 6, inclusive. In certain embodiments, the system includes a total of n rotors, where the maximum flow-through area includes a fraction of a total flow area of the gaseous fluid stream, and where the fraction has a value between $$\left(1 - \frac{n}{n+1}\right)$$

and 0.5.

Another exemplary embodiment is an apparatus, including a rotary valve disposed in a gaseous flow stream, and a first rotor and a second rotor. The rotors in a first position close the gaseous flow stream and in a second position include a maximum flow-through area that is more than 50% of a total flow area of the gaseous flow stream. The apparatus further includes a stator coupled to the rotors, the stator having a flow-through area that includes the maximum flow-through area. In certain embodiments, the first rotor and second rotor rotate simultaneously and in opposite directions, and a single actuator may engage both the first rotor and the second rotor. The exemplary apparatus includes the first rotor and second rotor made of a high temperature material, and the stator made of stainless steel. In further embodiments, the gaseous flow stream includes an engine related fluid conduit including an exhaust fluid conduit, an EGR fluid conduit, or an EGR cooler bypass fluid conduit.

Yet another exemplary embodiment is an article of manufacture, including a first rotor having a first flow-through area and a first ridged arc member, where the first flow-through area includes more than 50% of a total first rotor flow area. The article of manufacture further includes a second rotor having a second flow-through area and a second ridged arc member, where the second flow-through area includes more than 50% of a total second rotor flow area. The article of manufacture further includes an upstream stator and a downstream stator, each stator having a co-extensive stator flow-through area and a co-extensive structural area. The article of manufacture includes an actuator having an engagement gear, where the engagement gear is disposed between the first ridged arc member and the second ridged arc member, such that a turn of the engagement gear moves the first ridged arc member and the second ridged arc member in opposing directions. The first rotor and the second rotor are phased such that, at a first position of the engagement gear the first flow-through area and the second flow through area are co-extensive and include the co-extensive stator flow-through area, and at a second position of the engagement gear the first rotor and second rotor co-ordinate to cover the co-extensive stator flow-through area.

Certain embodiments of the article of manufacture further include a spacer engaging the upstream stator and the downstream stator, the spacer having an axial extent encompassing the upstream stator and the downstream stator. The article of manufacture further includes a ceramic spacer disposed between the actuator and the spacer. The upstream stator and the downstream stator may be stainless steel. Further embodiments of the article of manufacture further include a first beveled washer disposed between the upstream stator and the first rotor, and a second beveled washer disposed between the downstream stator and the second rotor. In certain embodiments, the first flow-through area is between 55% to 75% of the total first rotor flow area, and the second flow-through area is between 55% to 75% of the total second rotor flow area.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine having a gaseous flow stream;
   a rotary valve disposed in the gaseous flow stream, comprising:
      a first rotor and a second rotor wherein the first rotor and the second rotor rotate simultaneously and in opposite directions;
      wherein the rotors in a first position close the gaseous flow stream and in a second position comprise a maximum flow-through area; and
      a stator coupled to the rotors, the stator having a flow-through area comprising the maximum flow-through area.

2. The system of claim 1, wherein the maximum flow-through area comprises more than 50% of a total flow area of the gaseous flow stream.

3. The system of claim 1, wherein the gaseous flow stream comprises a stream selected from: an exhaust gas recirculation (EGR), an EGR cooler bypass, a turbine bypass, a compressor bypass, an intercooler bypass, and an aftertreatment component bypass.

4. The system of claim 1, further comprising a second stator, each of the stator and the second stator engaging a spacer, and the second stator having a second flow-through area comprising the maximum flow-through area.

5. The system of claim 4, wherein each of the flow-through area and the second flow-through area correspond to the maximum flow-through area.

6. The system of claim 1, further comprising a single actuator that moves both rotors.

7. The system of claim 1, wherein the maximum flow-through area comprises more than 66% of a total flow area of the gaseous flow stream.

8. The system of claim 1, further comprising a total of n rotors, wherein the maximum flow-through area comprises a fraction of a total flow area of the gaseous fluid stream, the fraction comprising a value between $$\left(1 - \frac{n}{n+1}\right) \text{ and } \left(1 - \frac{n-1}{n}\right).$$

9. The system of claim 8, wherein n comprises a value between 3 and 6, inclusive.

10. The system of claim 1, further comprising a total of n rotors, wherein the maximum flow-through area comprises a fraction of a total flow area of the gaseous fluid stream, the fraction comprising a value between $$\left(1 - \frac{n}{n+1}\right)$$

and 0.5.

11. An apparatus, comprising:
a rotary valve disposed in a gaseous flow stream, comprising:
a first rotor and a second rotor wherein the rotors in a first position close the gaseous flow stream and in a second position comprise a maximum flow-through area that is more than 50% of a total flow area of the gaseous flow stream; and
a stator coupled to the rotors, the stator having a flow-through area comprising the maximum flow-through area, wherein the first rotor and second rotor rotate simultaneously and in opposite directions.

12. The apparatus of claim 11, further comprising a single actuator that engages both the first rotor and the second rotor.

13. An apparatus, comprising:
a rotary valve disposed in a gaseous flow stream, comprising:
a first rotor and a second rotor wherein the rotors in a first position close the gaseous flow stream and in a second position comprise a maximum flow-through area that is more than 50% of a total flow area of the gaseous flow stream; and
a stator coupled to the rotors, the stator having a flow-through area comprising the maximum flow-through area, wherein the first rotor and second rotor comprise a high temperature material, and wherein the stator comprises stainless steel.

14. The apparatus of claim 13, wherein the gaseous flow stream comprises an engine related fluid conduit comprising a fluid conduit selected from the fluid conduits consisting of an exhaust fluid conduit, an EGR fluid conduit, and an EGR cooler bypass fluid conduit.

15. An article of manufacture, comprising:
a first rotor having a first flow-through area comprising more than 50% of a total first rotor flow area and further having a first ridged arc member;
a second rotor having a second flow-through area comprising more than 50% of a total second rotor flow area and further having a second ridged arc member;
an upstream stator and a downstream stator, each stator comprising a co-extensive stator flow-through area and a co-extensive structural area;
an actuator comprising an engagement gear, wherein the engagement gear disposed between the first ridged arc member and the second ridged arc member, wherein a turn of the engagement gear moves the first ridged arc member and the second ridged arc member in opposing directions; and
wherein the first rotor and second rotor are phased such that:
at a first position the first rotor and second rotor co-ordinate to cover the co-extensive stator flow-through area; and
at a second position of the engagement gear the first flow-through area and the second flow through area are co-extensive and comprise the co-extensive stator flow-through area.

16. The article of manufacture of claim 15, further comprising a spacer engaging the upstream stator and the downstream stator and having an axial extent encompassing the upstream stator and the downstream stator.

17. The article of manufacture of claim 16, further comprising a ceramic spacer disposed between the actuator and the spacer.

18. The article of manufacture of claim 15, wherein the upstream stator and the downstream stator comprise stainless steel.

19. The article of manufacture of claim 15, further comprising a first beveled washer disposed between the upstream stator and the first rotor, and a second beveled washer disposed between the downstream stator and the second rotor.

20. The article of manufacture of claim 15, wherein the first flow-through area comprises 55% to 75% of the total first rotor flow area, and wherein the second flow-through area comprises 55% to 75% of the total second rotor flow area.

* * * * *